March 9, 1937. T. S. GORDON 2,073,475
POT HANDLE
Filed April 3, 1936
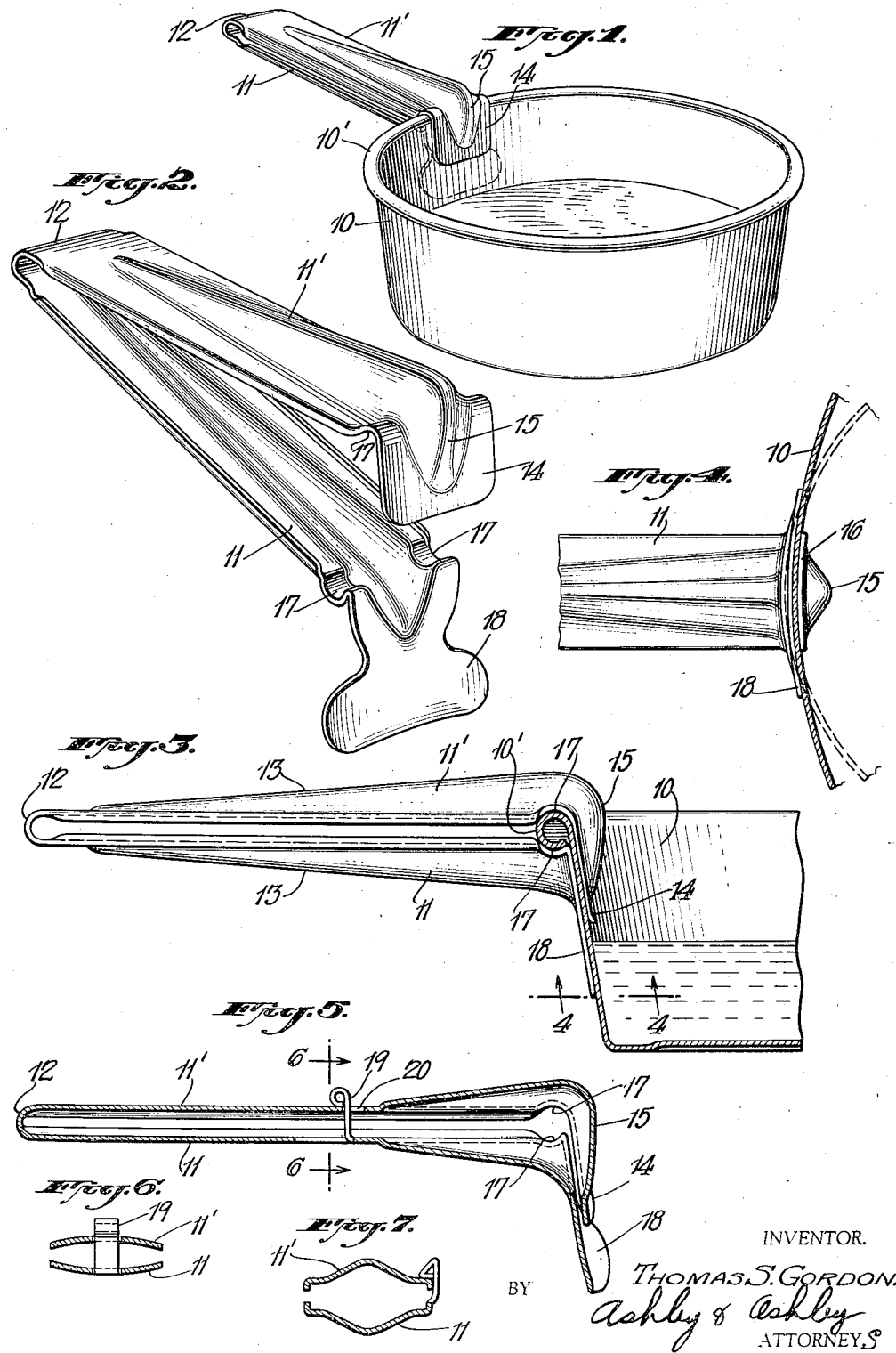
INVENTOR.
Thomas S. Gordon.
BY Ashley & Ashley
ATTORNEYS Patented Mar. 9, 1937

2,073,475

UNITED STATES PATENT OFFICE 2,073,475

POT HANDLE

Thomas S. Gordon, New Brunswick, N. J.

Application April 3, 1936, Serial No. 72,455

7 Claims. (Cl. 294—33)

My invention relates to handles for pots and pans.

The object of my invention is to provide a handle for pots and pans, etc. that may be instantly attached or detached by the hand of the user to a side portion of a pot, and also to provide means for automatically locking the handle to the pot in the act of attaching it thereto.

A further object is to provide a handle that may be made in a single piece of thin resilient sheet metal by simple stamping and drawing methods whereby the device may be made at a very low cost, and may be made light in weight.

Referring to the drawing which forms a part of these specifications:

Fig. 1 is a perspective view of a pan or pot of usual construction with a pot handle embodying my invention resting thereon in clasping relation.

Fig. 2 is a perspective view of my handle in its normal form, without the locking means feature.

Fig. 3 is a side view of the handle shown in Fig. 2 in its closed condition as it appears when clasping a pan.

Fig. 4 is an inverted plan view, taken on line 4—4 of Fig. 3.

Fig. 5 is a longitudinal view, shown in section, in which the locking means is shown in the act of locking the upper and lower parts of the handle in closed position.

Fig. 6 is a cross sectional view taken on line 6—6 of Fig. 5.

Fig. 7 is a cross sectional view illustrating another way of making the locking construction.

10 indicates a pan or dish having a beaded upper rim 10' formed in the usual manner common to the art. 11 and 11' indicate the lower and upper half portions respectively, and 12 the hinge portion which is made integral therewith.

Due to the resiliency of the metal, the hinge acts as a spring and normally holds the handle portions apart as shown.

Both the upper and lower portions of the handle are preferably formed with arched strengthening ribs 13—13 respectively, that in the upper portion extending beyond the front plane surface 14 as illustrated at 15.

The blade portion comprising the plane surface 14, extends below the rib 13 and is deeply embossed as illustrated at 15, and at each side thereof it extends for a considerable distance to provide spring action since the metal will flex under pressure and conform to the curvature of the pan in a circumferential direction, as illustrated at 16 in Fig. 4.

Both the upper and lower side portions are formed with grooves 17 17 respectively, adapted to embrace the rim of the pan, and serve to position the handle and also to prevent the weight of the pan and its contents from prying the jaws apart, to some extent, when the pan is provided with a beaded rim.

The lower jaw member is made to extend a predetermined distance below the end of the upper member and is bent to extend a short distance inwardly, and laterally, as shown in Figures 2 and 5 to form a spring 18 which bends and conforms to the curvature of the pan to support it firmly, even tho there is no bead on the pan, and regardless of the angle of the sides relative to the plane surface of the bottom thereof.

In Fig. 6 I have illustrated a construction in which the side edges of the handle are turned over to stiffen them, and form the jaws and handle portion adjacent thereto with the arched embossed rib construction.

In Figures 5, 6 and 7, I have shown means used to hold the handle portions together in locked relation.

In Figure 5, a spring 19 is formed by punching a part of the metal from the lower member and bending it so that its free end will extend upward thru a slot 20 formed in the upper member, and bending the top end of the spring as shown to form a latch which will automatically spring over the top side of the upper member and hold it in locked engagement, and which will be instantly released when pressed forward by the thumb of the user, as will be readily understood.

In the construction shown in Figure 7, the spring is also formed integral with the lower side member, but it extends outside of the upper member and snaps into locking position thereover as illustrated.

In both cases, the spring is located in a convenient position to be operated by the thumb of the user.

The form and construction is such that by holding the handle in a vertical position, a hot dinner plate may be clasped thereby and easily handled.

As indicated in dotted lines in Figure 4, pans having walls of varying curvature may be firmly held, due to the flexing action of the ends of the jaw members.

It is believed that the drawing and description clearly describe and disclose the invention in such manner as to enable any person skilled in the art to which this invention pertains, to make and use the same.

Having thus described my invention I claim as new:

1. A pot handle of the character described comprising jaw members which are formed rigid adjacent the handle portions and are provided with resilient flexible portions both below and at the sides of said rigid portions which may flex laterally and toward each other, together with: said lower jaw member extending below the upper jaw member a predetermined distance and extending outwardly therefrom beyond the under side thereof.

2. A pot handle of the character described comprising handle portions joined by a spring at one end and having jaws formed integral with the handle portions, each handle portion having a longitudinally outwardly extending arched strengthening rib, that of the upper handle extending beyond the plane surface of the front end thereof and each portion formed with a transverse groove formed adjacent the jaw and formed to engage the rim on a pan.

3. The construction defined in claim 2, together with; one of said jaw members being longer than the other and formed with a flexible end which extends thereunder when the jaws are closed.

4. A pot handle comprising handle portions joined by a spring at one end and having jaws formed on their other ends, each jaw formed with a rigid portion adjacent the handle which extends over the jaw beyond the handle, and a flexible portion extending therefrom.

5. The construction defined by claim 4, together with; means formed integral comprising a latch for holding said handle portions together in locked relation.

6. A pot handle having two jaws, each of which is provided with a stiff rib and a thin flexible spring portion extending below the rib and laterally relative thereto, and handle portions carrying said jaws and connected together at their outer ends with the jaw carrying ends being normally separated a predetermined distance from each other to hold the jaws in open relation.

7. The construction defined in claim 6, together with: and a latch located adjacent to the jaw members and constructed to automatically interlock the handle portions together in the act of closing the jaws.

THOMAS S. GORDON.